June 23, 1953  J. LE VALLEY  2,642,954
GAS RECEIVER-LIQUID SEPARATOR UNIT
Filed April 26, 1950
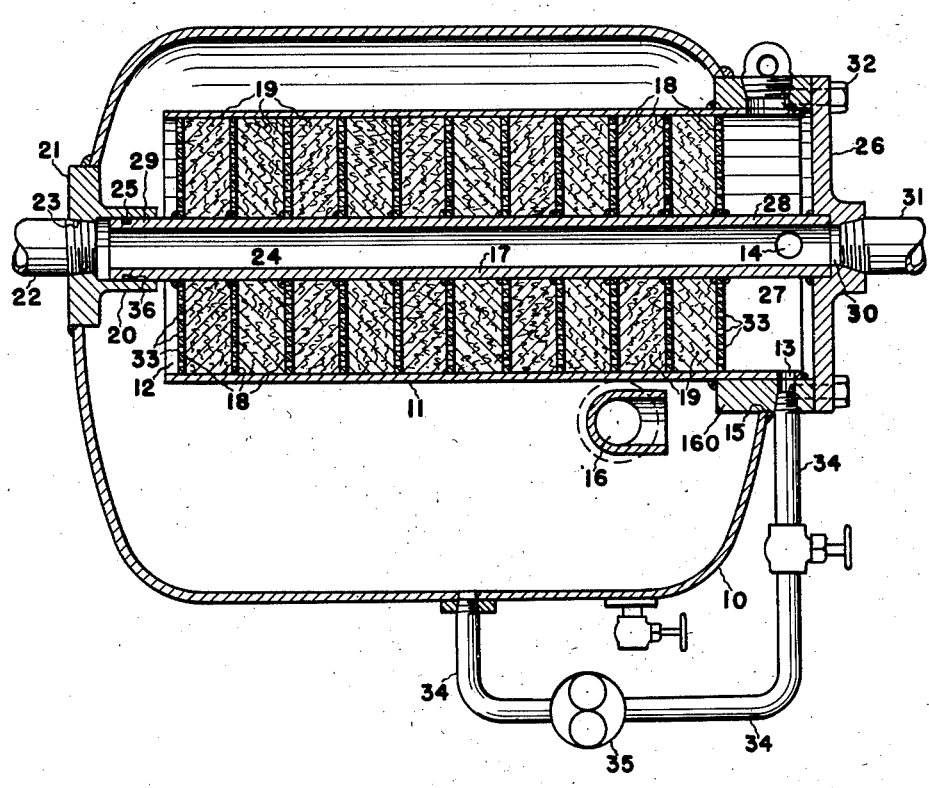
INVENTOR
JOHN LE VALLEY
BY
HIS ATTORNEY Patented June 23, 1953

2,642,954

UNITED STATES PATENT OFFICE 2,642,954

GAS RECEIVER-LIQUID SEPARATOR UNIT

John Le Valley, Painted Post, N. Y., assignor to Ingersoll-Rand Company, New York, N. Y., a corporation of New Jersey Application April 26, 1950, Serial No. 158,302

5 Claims. (Cl. 183—49)

This invention relates to gas receiver-liquid separator units, and more particularly to an air receiver-oil separator unit for use in connection with compressed air installations wherein it is desired to separate from the air, oil entrained therein.

The present invention has been found to be particularly adaptable for removing oil from air compressed in a rotary compressor. In such installations, oil is injected into the air prior to or during the compression of the air in the rotary compressor in order to cool the air and to lubricate the compressor. The air discharged from the compressor accordingly, contains a substantial amount of entrained oil which, for purposes of economy and also because many air operated devices require clean air, must be removed. The present invention serves not only this purpose, but serves also as an air receiver for the compressor and a storage tank for oil to be used in the compressor.

One object of this invention is to provide an air receiver-oil separator unit of high efficiency which is simple in construction and compact in design.

Another object of this invention is to combine the oil separator unit with the air receiver in such a manner that the filter in the separator is readily removable from the unit.

A further object is to combine the air receiver and the oil separator in such a manner that the receiver serves as a storage tank for both oil and air.

Further objects will become apparent from the accompanying specification and drawing which is a longitudinal elevation, partly in section, of a preferred form of the unit.

Referring to the drawing, the unit shown comprises, in general, a tank 10 for receiving oil laden compressed air and in which is mounted a casing 11 of an oil filter. In its preferred form, the inlet opening 12 of the casing 11 is positioned at one end of the tank 10 and the gas inlet 16 for the tank 10 is located at the opposite end of said tank so that gas passing from the tank inlet to the filter inlet travels substantially the full length of the tank 10 thereby permitting gravitational separation of a material quantity of the oil from such gas prior to its entry into the filter. Gas passing through the filter is cleaned of the remaining entrained oil, and this oil is collected at and drained from the discharge end of the casing 11 through the discharge passage 13. A gas discharge port 14 located at the same end of the casing 11 as the passage 13 but displaced vertically therefrom, permits the now cleaned air—and experiments have shown that this unit is capable of removing 99.9994±.0003 percent of the oil—to be discharged from the unit.

It is also to be noted that the discharge end of the casing 11 is located at the inlet end of the tank 10 and exteriorly thereof so that the oil filter, slidable in the casing 11, may be readily inserted in or removed from the casing 11.

Referring in greater detail to the exact construction of the unit, the casing 11 is tubular in shape and extends into the tank 10 through an opening 15 in the inlet end thereof—by inlet end of the tank 10 it is meant the end of the tank adjacent the gas inlet 16 of said tank. The casing 11 is of substantially the same length as the tank 10 and extends thereinto for substantially the entire length of said tank, or in other words, the inlet end of the casing 11 lies in a vertical plane adjacent the end of the tank 10 opposite the inlet end thereof, hence air entering the tank 10 must pass along substantially the entire length of the tank in order to enter the filter.

In furtherance also to the end that oil entrained in the gas entering the tank 10 will be separated therefrom by the force of gravity and other forces before its entrance into the filter, the inlet pipe 16 is displaced vertically from the bottom of the tank and located adjacent an end thereof, and the end portion of the pipe 16 assumes the form of an elbow or 90 degree angle in the horizontal plane of the tank so as to direct the flow of gas entering the tank toward the adjacent end surface thereof. By virtue of this arrangement, not only is the flow path from the inlet pipe 16 to the opening 12 of the filter substantially equal to the length of the tank 10, but it is also to be noted that there is a double reversal of the air flow path between these two points. Such a flow path causes a material decrease in the velocity of the gas thereby permitting the oil entrained in the gas to settle in the tank, also some oil is separated from the air by centrifugal force, due to the difference in mass of the liquid and gas, when the flow path is reversed. Moreover, some oil is separated from the air due to its contact with the end surface of the tank at which it is directed.

The casing 11 is secured at its discharge end portion to the tank 10, and in furtherance to this end a hoop, or collar, 160 having an outside diameter substantially equal to the diameter of the opening 15 is fitted therein and welded to the tank. The inside diameter of the hoop 160 is substantially equal to the outside diameter of the casing 11 which is inserted therein and welded to the hoop.

Slidable in the casing 11 is the filter, or means for removing oil from gas passing through the casing. In its preferred form this filter comprises a discharge pipe 17 on which are mounted perforated disks or fins 18. The fins 18 are of substantially the same diameter as the internal diameter of the casing 11 and are equally spaced relative to each other along and in transverse planes with respect to the pipe 17 so that when the filter is inserted in the casing 11, a series of chambers 19 are defined by the disks 18 and the casing 11. The perforations, or openings, in the disks 18 communicate the compartments in series to permit gas to flow from compartment to compartment throughout the length of the casing 11. Provided within these chambers 19, with the exception of the downstream compartment 27, is a material, such as raw sheep's wool, suitable for straining oil entrained in the gas passing through the filter.

The results of experimentation have shown that by separating the straining material, the wool, by means of perforated disks, not only is the gas more thoroughly cleaned in passing through the strainer, but it was also noted that the pressure differential between the opposite ends of the strainer is materially less than in cases where the separating material was not divided by such disks. One possible explanation of this is that the straining material does not, when separated in the manner aforesaid, tend to pack-up at the down stream end of the filter thereby causing a large pressure drop and lowering of its ability to strain oil from the gas effectively.

The discharge pipe 17 extends throughout the entire length of the casing 11, and one end 29 of the pipe 17 extends beyond the inlet, or free, end of the casing 11 and is mounted in a tubular extension 20 of a support member 21 mounted in the end of the tank 10. A pipe 22 threaded in a hole 23 in the member 21 is in communication with the passage 24 in the pipe 17. With this arrangement the pipe 17 serves not only as a means for supporting the casing 11, but also as a discharge passage for cleansed air from the tank 10. In order to prevent the escape of uncleansed gas from the tank along the interior of the extension 20 and thence into the discharge passage, suitable sealing means are provided at the end of the discharge pipe 17. In the form of the invention illustrated, this means comprises a circumferential groove 36 in the end of the pipe 17 and an O-ring 25 in said groove.

The opposite end 28 of the discharge pipe 17 extends beyond the downstream terminal disk 18 and is welded to a cover 26 enclosing the end of the casing 11. More particularly, the marginal portion of the cover abuts the end surface of the hoop 160 and is held in sealing relation therewith by means of bolts 32 passing through the cover 26 and threaded in said hoop. With this arrangement, an open compartment 27 is defined between the downstream terminal disk 18 and the cover 26. Oil strained from the gas is collected in this compartment 27 and drained from the separator through the discharge passage 13 leading from a point adjacent the downstream side of the downstream terminal disk 18 through the casing 11 and the collar 160. This oil may, if desired, be returned to the tank 10. In furtherance to this end, a conduit 34 is connected between the passage 13 and the bottom of the tank; and means, such as the pump 35, is inserted in the conduit 34 to overcome the drop in pressure across the separator. Cleansed air is discharged from this compartment through the discharge port 14 located in the pipe 17 at a point adjacent the downstream side of the downstream terminal disk 18 and within the compartment 27.

In order to permit the removal of cleansed air from either end of the tank 10, the end 28 of the pipe 17 is in communication through a hole 30 in the plate 26, with a pipe 31 threaded in the outer end of said hole.

Reviewing briefly the operation of the unit, oil laden air enters the tank 10 through the pipe 16 and is directed against the inner end surface of the tank 10 whereat a portion of the oil entrained in the air collects on the end of the tank and is drained to the bottom of the tank. The air then is dispersed throughout the tank 10 thereby lowering the velocity of the gas to a value whereat a considerable portion of the oil still entrained in the air settles into the lower portion of the tank 10. Hence air in passing from the inlet pipe 16 to the separator inlet is cleansed of a substantial percentage of the oil entrained therein. The remainder of this oil is cleansed from the air passing through the filter by the wool, or other straining material. This oil collects in the lower portion of the casing 11 and, because the oil outlet end of the casing is on the level with or lower than the inlet end of the casing, the oil flows along the lower portion of the casing into the compartment 27 from which it is drained through the passage 13 and returned to the tank 10 or utilized in any desired manner. The cleansed air flows along the casing 11, through the perforations 33 in the disks 18, into the compartment 27 and is discharged through the port 14 in the discharge pipe 17. The air flow occurs, of course, due to the pressure differential between the inlet 12 and the chamber 27. Such flow, it is to be noted, also aids the flow of oil in a direction toward the chamber 27.

It is apparent from the foregoing discussion that an air receiver-oil separator unit constructed in accordance with the practice of the invention, accomplishes, among others, the objects hereinbefore stated, and is capable of attaining a high degree of oil separation in a simple and efficient manner.

I claim:

1. An air receiver-oil separator unit comprising a tank, an inlet pipe entering said tank adjacent one end thereof and arranged to direct the flow of oil laden air against said end thereof, a casing extending into said tank from said end thereof and having an inner open end adjacent the other end of said tank and an outer end located exteriorly of said tank, oil separating means slidable in said casing for separating oil from air passing through said casing, said means including a cover for enclosing the outer end of the casing, and a discharge pipe extending throughout the entire length of said casing and mounted at one end on the tank and at its other end on said cover, a port in said pipe, a discharge conduit in communication with an end of said discharge pipe for conveying cleansed air from said tank, and an oil discharge passage for the casing.

2. An air receiver-oil separator unit comprising, a tank for storing compressed air and having an inlet for oil laden air, a casing in communication with the interior of said tank, oil separating means removably mounted in said casing, an air discharge opening for the casing, an oil discharge opening for the casing at the same end of the casing as the air discharge opening, and means for returning oil from the oil discharge opening to said tank.

3. An air receiver-oil separator unit comprising a tank for receiving and storing oil laden air, an inlet for admitting such air, a casing extending into said tank and having an inlet in communication with the interior of the tank, said casing being of such size as to occupy substantially less volume than the volume defined by such tank to permit a reduction in the velocity of air entering the tank before entering said inlet of the casing, oil separating means slidable in said casing for separating oil from air passing therethrough, said means including a member extending through the casing, perforated discs positioned within said casing for separating the casing into compartments and being secured to said member to permit removal of the separator as a unit from said casing, and oil and air discharge passages for said casing.

4. A gas receiver-liquid separator unit comprising, a tank having an inlet for liquid laden gas, a casing having an inlet opening at the upstream end thereof in communication with the interior of the tank, fins mounted within the casing for separating the interior of the casing into a series of compartments, said fins having openings therein for the passage of such gas from compartment to compartment throughout the length of the casing, separating material in the compartments for separating liquid from the gas passing through the casing, and a gas outlet and a liquid outlet in the casing adjacent the downstream side of the downstream terminal fin.

5. A gas receiver-liquid separator unit comprising, a tank having an inlet for liquid laden gas, a casing mounted in the tank having an inlet opening at the upstream end thereof in communication with the interior of the tank, the downstream end of said casing being mounted relative to the upstream end of the casing so as to cause liquid separated from gas passing through the casing to drain to one side of the casing and thence therealong said side to the downstream end of the casing, fins mounted in the casing for separating the interior of the casing into compartments, said fins having openings therein for communicating said compartments in series to permit such gas to flow through the casing, separating material in the compartments in all but the downstream end compartment for separating liquid from the gas passing through the casing, and a gas outlet and a liquid outlet in the downstream end compartment of the casing, said liquid outlet being located at said side of the casing.

JOHN LE VALLEY.

References Cited in the file of this patent

UNITED STATES PATENTS

| Number | Name | Date |
|---|---|---|
| 805,305 | Lieber | Nov. 21, 1905 |
| 995,103 | Speer | June 13, 1911 |
| 1,531,096 | Hoffman | Mar. 24, 1925 |
| 1,532,657 | Fleisher | Apr. 7, 1925 |
| 1,535,819 | Emmet | Apr. 28, 1925 |
| 1,729,135 | Slauson | Sept. 24, 1929 |
| 1,860,778 | Howard | May 31, 1932 |
| 1,888,813 | Wenslow | Nov. 22, 1932 |
| 2,096,851 | Fricke | Oct. 26, 1937 |
| 2,144,681 | Kraissl | Jan. 24, 1939 |
| 2,402,140 | Heintzelman | June 18, 1946 |